United States Patent
Choi et al.

(10) Patent No.: US 9,518,309 B2
(45) Date of Patent: Dec. 13, 2016

(54) METHOD OF MANUFACTURING POROUS METAL FOAM

(71) Applicant: Kookmin University Industry Academy Cooperation Foundation, Seoul (KR)

(72) Inventors: Myoung-Geun Choi, Guri-si (KR); Hyun-Gyung Jo, Goyang-si (KR); Hye-Ji Park, Seoul (KR); Yoon-Sook Noh, Seoul (KR); Yun-Sung Kim, Seoul (KR); Chang-Ui Ahn, Daejeon (KR); Seok-Woo Jeon, Daejeon (KR); Dong-Seok Kim, Wonju-si (KR); Do-Kyung Kim, Daejeon (KR); Hee-Man Choe, Gunpo-si (KR)

(73) Assignee: KOOKMIN UNIVERSITY INDUSTRY ACADEMY COOPERATION FOUNDATION, Seoul (KR)

(*) Notice: Subject to any disclaimer, the term of this patent is extended or adjusted under 35 U.S.C. 154(b) by 899 days.

(21) Appl. No.: 13/731,498

(22) Filed: Dec. 31, 2012

(65) Prior Publication Data
US 2014/0182808 A1   Jul. 3, 2014

(51) Int. Cl.
| | | |
|---|---|---|
| C22C 1/08 | (2006.01) | |
| C23C 18/16 | (2006.01) | |
| C23C 18/28 | (2006.01) | |
| C23C 18/30 | (2006.01) | |
| C23C 18/36 | (2006.01) | |
| C23C 18/20 | (2006.01) | |
| C23C 18/40 | (2006.01) | |
| C08J 9/36 | (2006.01) | |

(52) U.S. Cl.
CPC .............. *C22C 1/08* (2013.01); *C08J 9/365* (2013.01); *C23C 18/1639* (2013.01); *C23C 18/1644* (2013.01); *C23C 18/1657* (2013.01); *C23C 18/204* (2013.01); *C23C 18/2006* (2013.01); *C23C 18/2086* (2013.01); *C23C 18/285* (2013.01); *C23C 18/30* (2013.01); *C23C 18/36* (2013.01); *C23C 18/405* (2013.01); *C08J 2201/038* (2013.01)

(58) Field of Classification Search
CPC ........ C22C 1/08; C08J 9/365; C08J 2201/038; C23C 18/1639; C23C 18/1644; C23C 18/1657; C23C 18/2006; C23C 18/204; C23C 18/2086; C23C 18/285; C23C 18/30; C23C 18/36; C23C 18/38; C23C 18/405
See application file for complete search history.

(56) References Cited

U.S. PATENT DOCUMENTS

| | | | |
|---|---|---|---|
| 6,395,402 B1 * | 5/2002 | Lambert | C23C 18/1619 106/1.25 |
| 8,962,190 B1 * | 2/2015 | Gross | H01M 4/80 429/209 |
| 2012/0231290 A1 * | 9/2012 | Ho | B82Y 30/00 428/566 |

* cited by examiner

Primary Examiner — Roy King
Assistant Examiner — Tima M McGuthry Banks
(74) Attorney, Agent, or Firm — Paratus Law Group, PLLC

(57) ABSTRACT

A method of manufacturing a porous metal foam having pores of nano size includes: manufacturing a porous polymer foam containing pores of nano size; and coating metal on the porous polymer foam through electroless plating. The present invention provides porous metal foams which contains nano-sized pores and hence, their specific surface area is maximized owing to the regularly-patterned nanoporous structure formed inside.

16 Claims, 1 Drawing Sheet

METHOD OF MANUFACTURING POROUS METAL FOAM

BACKGROUND OF THE INVENTION

1. Field of the Invention

The present invention relates to a method of manufacturing a porous metal foam, and more particularly to a method of manufacturing a porous metal foam containing pores having a nano size.

2. Description of the Prior Art

A porous metal foam is a porous metal containing numerous regular pores in a metal material, and is classified into an open cell (OC) type and a closed cell (CC) type. In the closed cell type metal foam, pores in a metal are not connected but present independently, and in the open cell type metal foam, those in the material are connected to each other such that a gas or fluid can pass through. Thus, the open cell type metal foam can provide a high density of surface area and can be used in functional applications requiring such need.

The open cell metal foam morphologically corresponds to a duodechahedronal structure similar to that of a human bone which is a structurally perfect stable isotropic structure, and has a wide surface area which cannot be mechanically realized, in addition to the structural stability.

Currently, the fields to which the open cell type metal foam is widely applied in advanced countries are aircraft industry requiring high efficiency, small size and light weight, vehicles, power plants, heat exchangers of power devices, heat radiating plates of semiconductor devices, silencers for large-scale plants, catalysts of chemical factories, aircrafts requiring high strength and ultra light weight, structural materials of space industry, fuel cells, and filters, and are gradually being expanded until now. Due to the global trends, a demand on the open cell type metal foam is increasing also in Korea.

A technology according to the related art includes a method of forming a nickel or copper layer on a surface of a polyurethane foam through physical vapor deposition and growing a nickel or copper layer through electrolytic plating to manufacture a metal foam having a nanoscale open porous structure in which nanopores are connected to each other, but the method requires a complex process such as physical vapor deposition and it is difficult to manufacture a thick porous foam as deposition rates of the surface and interior of the foam are different when the pores are fine.

Further, since a heat-resistant temperature of the polyurethane foam used as a frame is low and polyurethane is evaporated in an in-use environment of high temperature, fine pores are left in the final metal product at a site where polyurethane used to be as the polyurethane is generally evaporated during the production process and structural strength is lowered.

In order to overcome the disadvantages, there has been an attempt to form a nickel plating layer on a surface of carbon foam, but this technology has just demonstrated on a microporous-scale level, but not on nano-scale.

SUMMARY OF THE INVENTION

Accordingly, the present invention has been made to solve the above-mentioned problems occurring in the prior art, and an objective of the present invention is to provide a method of manufacturing metal foams containing nano-sized pores.

The present invention also provides a method of manufacturing porous metal foams, the surface area of which is maximized due to a regularly distributed nanoporous structure.

In order to accomplish this objective, a method of manufacturing a porous metal foam having nano-sized pores is provided, including the steps of: manufacturing a porous polymer foam containing nano-sized pores; and coating a metal on the porous polymer foam through electroless plating.

The method may further include the step of: removing the porous polymer foam by high-temperature heat-treatment after the electroless plating step.

In accordance with another aspect of the present invention, a method of manufacturing a porous metal foam having nano-sized pores is provided, which includes the steps of: (a) casting an elastomer mold on a patterned silicon wafer; (b) curing the cast elastomer mold; (c) separating the cured elastomer; (d) attaching a polymer (SU8) material on a glass substrate; (e) positioning the elastomer on the photo-resistive polymer (SU8) material; (f) irradiating ultraviolet (UV) light to the material of the step (e) to form a polymer foam containing nano-sized pores through diffraction and interference of the UV light; (g) pre-processing the polymer foam of the step (f) to improve surface wettability of the polymer foam; and (h) coating a metal on the pre-processed polymer foam through electroless plating.

The method may further include the step of: removing the polymer foam after the step (h).

Forming a pattern in the step (a) may include the steps of: (a-1) coating a photoresist material on a silicon wafer with a uniform thickness; (a-2) coating a photomask for forming a pattern on the photoresist layer; (a-3) irradiating UV light onto the photomask to soften the photoresist; and (a-4) etching the softened photoresist to form a pattern.

The pre-processing of the step (g) may be performed through $O_2$ plasma or UV cleaner processing to roughen the surface of the polymer.

The pre-processing of the step (g) may be performed with an ammonium hydroxide solution to increase roughness and specific surface area of the polymer.

The electroless-plated material in the step (h) may be any metal; the most suitable metal element in this processing is nickel or copper.

The coating of step (h) through electroless plating may include the steps of: etching a surface with $KMnO_4$ and $H_2SO_4$ to improve surface roughness and activate the surface; processing the surface with a tin chloride ($SnCl_2.H_2O$) and hydrochloric acid (HCl) solution or a palladium chloride ($PdCl_2$) and hydrochloric acid (HCl) solution to attach $Sn^{2+}$ or $Pd^{2+}$ to the activated surface; and immersing the polymer foam in a nickel plating liquid or a copper plating liquid.

The polymer foam may be immersed and chemically-treated in the nickel plating liquid with a pH ranging from 4 to 5.

The polymer foam may be immersed and chemically-treated in the copper plating liquid with a pH ranging from 11 to 12.

The present invention provides porous metal foams which contain nano-sized pores with its surface area maximized owing to a regularly nano-patterned structure.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
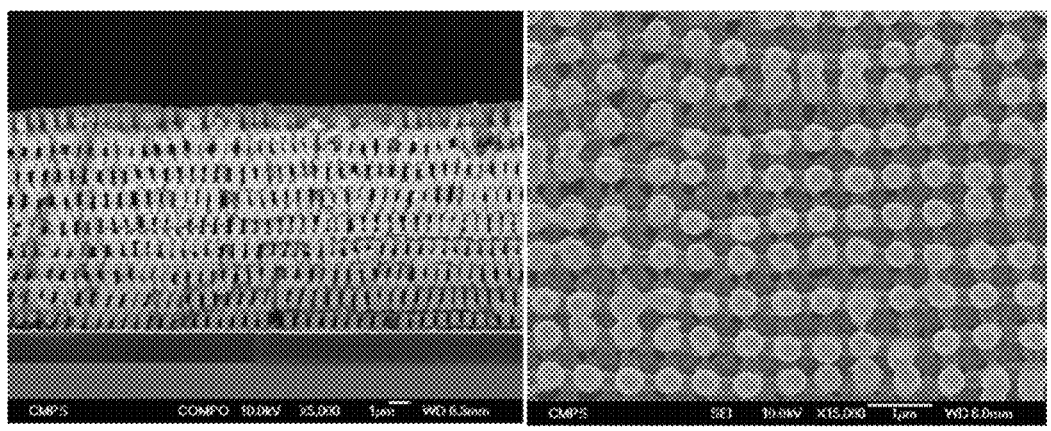
FIG. 1 is an image picture of a nanoporous polymer foam having a nickel plating layer through a manufacturing method according to the present invention.
Figure 2:
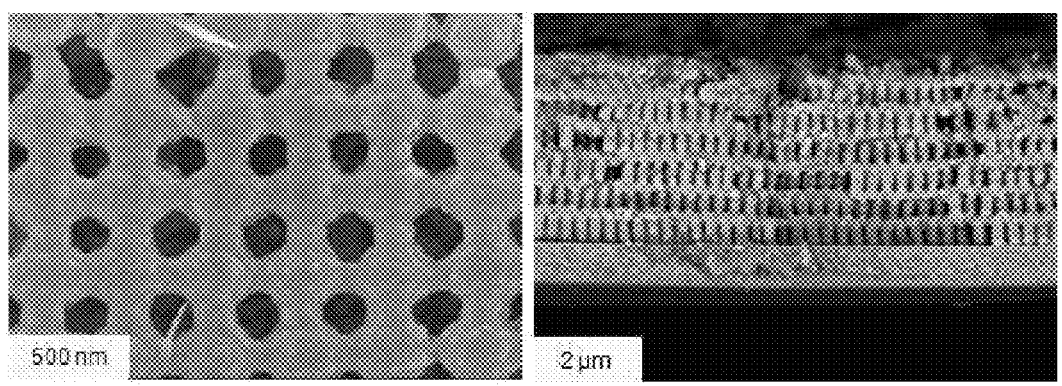
FIG. 2 is an image picture of a nanoporous polymer foam having a copper plating layer through a manufacturing method according to the present invention.

The present invention relates to a method of manufacturing a nanoporous metal foam, the method including the steps of: manufacturing a porous polymer foam containing nano-sized pores; and coating a metal on the porous polymer foam through electroless plating.

Hereinafter, the present invention will be described in detail with reference to the accompanying drawings.

The present invention is adapted to manufacture a metal foam containing nano-sized pores, and is adapted to manufacture a polymer foam containing nano-sized pores first, and plate metal on a surface of the polymer foam to manufacture a metal foam containing nanopores.

The present invention may further include the step of removing the porous polymer foam after the coating step to manufacture a porous foam containing only the metal.

A detailed process for the method of manufacturing a porous metal foam containing nano-sized pores according to the present invention includes the steps of:

(a) casting an elastomer on a silicon wafer having a pattern;

(b) curing the cast elastomer;

(c) separating the cured elastomer;

(d) attaching a polymer (SU8) material on a glass substrate;

(e) positioning the elastomer on the polymer (SU8) material;

(f) irradiating ultraviolet (UV) light to the material of the step (e) to form a polymer foam containing nano-sized pores by using diffraction and interference of light;

(g) pre-processing the polymer foam of the step (f) to improve surface wettability and roughness of the polymer foam; and (h) coating a metal on the pre-processed polymer foam through electroless plating.

The method may further include the step of removing the polymer foam after the step (h). The method of removing the polymer foam includes a method of melting the polymer foam with a solvent such as chloroform, HF, or a heat treatment method, but is not limited thereto.

As an embodiment, the forming of a pattern in the step (a) includes the steps of:

(a-1) coating a photoresist material on a silicon wafer in a uniform thickness;

(a-2) coating a photomask for forming a pattern on the photoresist layer;

(a-3) irradiating UV light onto the photomask to soften the photoresist; and (a-4) etching the softened photoresist to form a pattern.

The pre-processing of the step (g) is preferably performed through $O_2$ plasma or UV cleaner processing.

The pre-processing of the step (g) is preferably performed with an ammonium hydroxide solution.

The metal in the step (h) through the electroless coating may be nickel or copper, but is not limited thereto.

The coating of step (h) through electroless plating may include the steps of:

etching a surface with $KMnO_4$ and $H_2SO_4$ to improve surface roughness and activate the surface;

processing the surface with a tin chloride ($SnCl_2 \cdot H2O$) and hydrochloric acid (HCl) solution or a palladium chloride ($PdCl_2$) and hydrochloric acid (HCl) solution to attach $Sn^{2+}$ or $Pd^{2+}$ to the activated surface; and immersing the polymer foam in a nickel plating liquid or a copper plating liquid.

In the immersing of the polymer foam in a nickel plating liquid or a copper plating liquid, sonication may be performed.

When nickel is used as the plating metal, the polymer foam is processed in the nickel plating liquid, a pH of which ranges from pH 4 to 5, and when copper is used as the plating metal, the polymer foam is processed in the copper plating liquid, a pH of which ranges from pH 11 to 12. When the range is deviated, the plating liquid becomes thick, making it difficult to form the plating layer.

The polymer used to form a polymer foam in the processes may include at least one selected from negative photoresists such as SU-8, polyhedral oligomeric silsesquioxane (POSS) and positive photoresists such as AZ5214, and in particular, a negative photoresist such as SU-8 is preferably used.

Hereinafter, the present invention will be described in more detail with reference to exemplary embodiments thereof. The embodiments are provided only to describe the present invention in detail, and it is apparent to those skilled in the art to which the present invention pertains that the scope of the present invention is not limited by the embodiments.

Example

1. Manufacturing of Porous Polymer

After a polymer was spin-coated on a glass substrate, heat of a temperature ranging from 60° C. to 90° C. was applied to the spin-coated glass substrate to evaporate the solvent. The substrate used here is not limited to a glass substrate, and a silicon or metal substrate may be used.

Next, after the polymer was contacted with a 5 µm to 10 µm thick conformal transparent phase mask, a He—Cd laser (wavelength: 325 nm, 30 mW) or Nd:YAG laser (wavelength: 355 nm, 500 mW) was irradiated. In addition to the above-described wavelengths, various wavelengths such as 405 nm and 532 nm may be used according to a substance of the polymer material. After the irradiation of light, heat of a temperature of 50° C. to 60° C. was applied to generate a selective curing reaction of the polymer.

In order to selectively remove a portion which is nonreactive to light, a developing process was performed on a propylene glycol methyl ether acetate (PGMEA) solvent for 30 minutes.

In order to restrain the porous structure from collapsing in the drying process, a supercritical drying process using a supercritical fluid of carbon dioxide ($CO_2$) was performed.

2. Pre-Processing Process

Sodium hydroxide (NaOH) of 10 g/L was defatted at a temperature of 70° C. for 3 minutes to remove contaminants from a surface of the polymer structure.

Next, a roughness of the surface of the polymer structure was improved to increase adhesion of catalytic ion by performing an etching process for processing potassium permanganate ($KMnO_4$) of 15 g/L and sulphuric acid ($H_2SO_4$) of 40.00 ml/L at a temperature of 25° C. for 3 minutes.

In order to activate the surface of the polymer structure, tin chloride ($SnCl_2.H_2O$) of 10.00 g/L and hydrochloric acid (HCl, 35%) of 40.00 ml/L were applied at a temperature of 30° C. for 3 minutes and palladium chloride ($PdCl_2$) of 2.00 g/L and hydrochloric acid (HCl, 35%) of 16.26 ml/L were applied at a temperature of 40° C. for 5 minutes, respectively. Through this process, $Sn^{2+}$ and $Pd^{2+}$ become stuck to the surface of the polymer foam to perform a catalytic operation of the surface of the polymer foam effectively.

3. Metal Plating Liquid (1) Nickel Plating Liquid

The plating liquid contained nickel sulfate ($NiSO_4 6H_2O$) of 21.32 g/L, sodium hypophosphite monohydrate ($NaPO_2H_2$) of 25.26 g/L, lactic acid ($C_3H_6O_3$) of 32.94 g/L, and propionic acid ($C_2H_5COOH$) of 2.24 g/L.

(2) Copper Plating Liquid

The plating liquid contained copper sulfate ($CuSO_4 5H_2O$) of 6.40 g/L, ethylenediamine tetraacetic acid of 70.00 g/L, glyoxylic acid (CHOCOOH) of 18.00 g/L, and polyethylene glycol of 0.50 g/L.

4. Electroless Plating (1) Nickel Plating

A surface of the three-dimensional polymer structure was pre-processed with $NH_4OH$, and was immersed in the nickel plating liquid (pH 4.1) at a temperature of 70° C. The result is shown in Table 1 and FIG. 1 shows a resulting image picture.

TABLE 1

| | Polymer | Electroless nickel plating |
|---|---|---|
| Pore size | 424.27 ± 26.3 nm | 330.65 ± 56.63 nm |
| Ligand width | 146.95 ± 47.89 nm | 221.56 ± 27.95 nm |
| Sample thickness | 10 μm | 10 μm |
| Plating speed | — | 67.21 ± 16.34 nm/min |
| Penetration depth of plating liquid | — | 1.19 ± 0.14 μm –> 10 μm |
| Content of phosphorous | — | 5~11 at % |

(2) Copper Plating

A surface of the three-dimensional polymer structure was pre-processed with $NH_4OH$, and was immersed in the copper plating liquid (pH 12) at a temperature of 70° C. The result is shown in Table 2.

TABLE 2

| | Polymer | Electroless nickel plating |
|---|---|---|
| Pore size | 424.27 ± 26.3 nm | 311.34 ± 26.90 nm |
| Ligand width | 146.95 ± 47.89 nm | 307.14 ± 23.21 nm |

TABLE 2-continued

| | Polymer | Electroless nickel plating |
|---|---|---|
| Sample thickness | 10 μm | 10 μm |
| Plating speed | — | 84.19 ± 8.1 nm/min |
| Penetration depth of plating liquid | — | 0.78 ± 0.09 μm –> 10 μm |
| Content of phosphorous | — | 0 at % |

As displayed in Tables 1 and 2, a metal-foam thin film having nano-sized pores with a uniform plating thickness and small roughness can be manufactured using metal (nickel, copper) plating formed on a surface of the polymer foam manufactured according to the manufacturing method of the present invention.

What is claimed is:

1. A method of manufacturing a porous metal foam having pores of nano size, the method comprising the steps of:
   manufacturing a porous polymer foam containing pores of nano size; and
   coating metal on the porous polymer foam through electroless plating,
   wherein the manufacturing a porous polymer foam includes:
   positioning a cured elastomer having a pattern thereon on a polymer material; and
   irradiating ultraviolet (UV) light to the polymer material through the cured elastomer to form the polymer foam containing pores of nano size using diffraction and interference of light.

2. The method as claimed in claim 1, further comprising the step of: removing the porous polymer foam after the coating step.

3. The method of claim 1, further comprising forming the cured elastomer, including:
   casting an elastomer on a wafer having the pattern;
   curing the cast elastomer; and
   separating the cured elastomer from the wafer.

4. The method of claim 1, further comprising etching a surface of the manufactured porous polymer with $KMnO_4$ and $H_2SO_4$ to improve surface roughness of the porous polymer and activate the surface of the porous polymer.

5. The method of claim 1, wherein the coating includes:
   processing the surface of the porous polymer with a tin chloride ($SnCl_2.H_2O$) and hydrochloric acid (HCl) solution, or a palladium chloride ($PdCl_2$) and hydrochloric acid (HCl) solution to attach $Sn^{2+}$ or $Pd^{2+}$ to the activated surface; and
   immersing the polymer foam in a nickel or copper plating liquid.

6. The method as claimed in claim 5, wherein the polymer foam is processed in the nickel plating liquid, a pH of which ranges from pH 4 to 5.

7. The method as claimed in claim 5, wherein the polymer foam is processed in the copper plating liquid, a pH of which ranges from pH 11 to 12.

8. A method of manufacturing a porous metal foam having pores of nano size, the method comprising the steps of:
   (a) casting an elastomer on a silicon wafer having a pattern;
   (b) curing the cast elastomer;
   (c) separating the cured elastomer;
   (d) attaching a polymer material on a glass substrate;
   (e) positioning the elastomer on the polymer material;

(f) irradiating ultraviolet (UV) light to the material of the step (e) to form a polymer foam containing pores of nano size using diffraction and interference of light;

(g) pre-processing the polymer foam of the step (f) to improve surface wettability of the polymer foam; and (h) coating metal on the pre-processed polymer foam through electroless plating.

9. The method as claimed in claim 8, further comprising the step of: removing the polymer foam after the step (h).

10. The method as claimed in claim 8, wherein the step (a) comprises:

(a-1) coating a photoresist material on the silicon wafer by a uniform thickness;

(a-2) attaching a photomask for forming the pattern on the photoresist material;

(a-3) irradiating UV light onto the photomask to soften the photoresist material; and (a-4) etching the softened photoresist material to form the pattern on the silicon wafer.

11. The method as claimed in claim 8, wherein the pre-processing of the step (g) is performed through $O_2$ plasma or UV cleaner processing.

12. The method as claimed in claim 8, wherein the pre-processing of the step (g) is performed with an ammonium hydroxide solution.

13. The method as claimed in claim 8, wherein the metal coated through electroless plating in the step (h) is nickel or copper.

14. The method as claimed in claim 13, wherein the coating of step (h) through electroless plating comprises the steps of:

etching a surface with $KMnO_4$ and $H_2SO_4$ to improve surface roughness and activate the surface;

processing the surface with a tin chloride ($SnCl_2.H_2O$) and hydrochloric acid (HCl) solution, or a palladium chloride ($PdCl_2$) and hydrochloric acid (HCl) solution to attach $Sn^{2+}$ or $Pd^{2+}$ to the activated surface; and immersing the polymer foam in a nickel or copper plating liquid.

15. The method as claimed in claim 14, wherein the polymer foam is processed in the nickel plating liquid, a pH of which ranges from pH 4 to 5.

16. The method as claimed in claim 14, wherein the polymer foam is processed in the copper plating liquid, a pH of which ranges from pH 11 to 12.

* * * * *